United States Patent

Dorica et al.

[11] Patent Number: 5,120,448
[45] Date of Patent: Jun. 9, 1992

[54] REMOVAL OF AOX FRM BLEACH PLANT MILL EFFLUENTS BY PH SHIFT USING THE ALKALINITY/ACIDITY SOURCES AVAILABLE AT THE MILL

[76] Inventors: Josesph G. Dorica, 137 Alston, Pointe Claire, Quebec, Canada, H9R 3E2; Joseph Sullivan, 1105 Woodside Drive, Dollard-des-Ormeaux, Quebec, Canada, H9B 1R1; Maurice Douek, 2315 Gold, St-Laurent, Quebec, Canada, H4M 1S5; Derrick A. Hill, 1047 Walcott, R.R. 1, Duncan, British Columbia V9L 1M3, Canada; George M. Milosevich, 1170 McKenzie Drive, R.R. 5, Duncan, British Columbia V9L 4T6, Canada; John P. Morgan, 6051 Trillium Way, Duncan, British Columbia V9L 4V3, Canada

[21] Appl. No.: 584,937

[22] Filed: Sep. 19, 1990

[51] Int. Cl.$^5$ .............................. C02F 1/58
[52] U.S. Cl. ................... 210/724; 162/30.1; 162/30.11; 162/33; 210/726; 210/737; 210/752; 210/761; 210/908; 210/919; 210/928
[58] Field of Search ............... 162/29, 30.1, 30.11, 162/31, 33; 210/724, 726, 737, 752, 761, 928, 919, 908

[56] References Cited

U.S. PATENT DOCUMENTS

| | | | |
|---|---|---|---|
| 3,833,464 | 9/1974 | Rolfe | 162/29 |
| 4,098,639 | 7/1978 | Noreus et al. | 210/928 |
| 4,347,144 | 8/1982 | Bodenbenner et al. | 210/761 |
| 4,350,599 | 9/1982 | Chowdhury | 210/761 |
| 4,530,765 | 7/1985 | Sabherwal | 210/928 |
| 4,874,521 | 10/1989 | Newman et al. | 210/919 |

FOREIGN PATENT DOCUMENTS 52-23854 2/1977 Japan ................... 210/928

OTHER PUBLICATIONS

Basta et al., Reducing levels of adsorbable organic halogens (AOX) Tappi Journal, Apr. 1990.
Migita et al., J. Japan Wood Res. Soc. L, 55 (1955).
Braddon and Dence, TAPPI 51 (6) 249 (1968).
Holmberg et al., Svensk Paperstd. 86 (5), R152 (1983).
Sun et al., TAPPI 72 (9), 209 (1989).
Bottger et al., "Dechlorination and Biological Treatment of Chlorinated Organic Substances", 4th Int. Symp.-Wood and Pumping Chemistry, Paris, France, 1989.
External Treatment of Bleach Plant Effluents, Bjorn Frostell, Swedish Environmental Research Institute—Paper presented at Swedish-Soviet Environmental Symposium in Leningrad, Soviet Union, Nov. 14-15, 1988.
A. Smeds et al., Formation and Degradation of Mutagens in Kraft Pump Mill Water Systems, Nordic Pulp and Paper Research Journal No. 3/1990.
B. Holmbom et al., Mutagenic Compounds in Chlorinated Waters, Organic Micropollutants in the Aquatic Environment, Proceedings of the Fifth European Symposium, Rome, Italy, Oct. 20-22, 1987, edited by G. Angeletti, published by Kluwer Academic Publishers.

Primary Examiner—Peter Hruskoci
Attorney, Agent, or Firm—Swabey Ogilvy Renault

[57] ABSTRACT

A process for removal of adsorbable organic chlorine (AOX) in which the acid-soluble AOX present in kraft chlorination ($C_D$) effluents are destabilized and converted to inorganic chloride by pH shift using the alkalinity and acidity sources available at the mill; $C_D$ effluent, typically having a pH of 1-2 and $E_1$ effluent, typically having a pH of 9-12 can be mixed in various proportions to achieve a pH between 6.5-9.0 or the $C_D$ effluent is adjusted in pH to 6-11 with an alkaline composition so taht alkaline hydrolysis as well as precipitation of organic material occurs and the treated effluent contains less AOX than present in the original untreated effluents; the AOX removal is enhanced substantially by (i) the presence of a sulphide or (ii) by carrying out the alkaline treatment at elevated temperature and pressure.

15 Claims, 5 Drawing Sheets

REMOVAL OF AOX FRM BLEACH PLANT MILL EFFLUENTS BY PH SHIFT USING THE ALKALINITY/ACIDITY SOURCES AVAILABLE AT THE MILL

BACKGROUND OF THE INVENTION (i) Field of Invention

This invention relates to removal of organically-bound chlorine from bleach plant effluents using alkaline hydrolysis.

(ii) Description of the Prior Art

Presence of chlorinated organic compounds in bleached kraft mill effluents has been recognized as an important environmental issue. Due to a low rate of mineralization, the high molecular weight chlorolignins are known to persist in an aquatic environment for prolonged periods of time. Regulations to decrease the discharge of adsorbable organic chlorine (AOX) in Canada and abroad have been introduced.

Several approaches are practiced for AOX control at bleached kraft mills. The in plant control is based on reducing the AOX formation during the bleaching by using extended delignification in the digester, oxygen delignification, high $ClO_2$ substitution, and improved pulp washing before bleaching. External effluent treatment can also reduce AOX substantially. Removal of AOX up to 50% has been reported for both the aerated lagoon and activated sludge treatments. The removal of AOX in aerated lagoons is believed to be accomplished principally by physical-chemical means, namely coagulation and absorption on biomass followed by removal of the biosolids by secondary clarification or by settling into the benthal zone. In the latter case, anaerobic mineralization of these compounds then apparently proceeds in the upper layer of the sediment close to the sediment-water interface.

Another approach to AOX mineralization is by hydrolysis of organic chlorine under alkaline conditions. The aliphatically bound chlorine is usually more susceptible to such hydrolysis than that bound aromatically, but the latter species can also be hydrolyzed under certain conditions, as shown by Migita et al, J. Japan Wood Res. Soc. L, 55 (1955) and Braddon and Dence, TAPPI 51 (6) 249 (1968). The degree of chlorine hydrolysis depends strongly on: the location of the chlorine atoms on the chlorolignin molecule; and the strength of the alkali solution used. Thus the chlorine in $\alpha$ position in dichloroisoeugenol was found to be removed completely upon one hour hydrolysis at 60° C. in water alone. The chlorine removal from 3,4,5,6-tetrachlorocatechol and 4,5-dichlorocatechol was also relatively fast, typically 52-72% removal after 3 hours at about 60° C., when the treatment was performed in 0.5M sodium hydroxide. This can be explained largely by the susceptibility of the catechol nucleus to oxidation by traces of oxygen to chloro-o-quinones. It has been suggested that the hydroxyquinones formed might serve, in the absence of oxygen, as oxidizing agents for the original chlorocatechols and this might help to dechlorinate these compound completely upon prolonged alkaline treatment. Similarly, the 3-chloro-5-methyl-o-quinone and 4-chloro-5-methyl-o-quinone were reported to undergo a chlorine loss, between 30 and 75%, respectively, when hydrolysed in 0.5M NaOH at 60° C. for one hour. The aliphatic oxidation products of chloro-o-benzoquinone, such as the chloromuconic acid derivatives, also lose chlorine upon NaOH hydrolysis, particularly that substituted in $\alpha$ position. On the other hand, the chlorine hydrolysis of $\beta$-chloromuconic acid proceeds relatively slowly while the hydrolysis of $\beta$-chloroacrylic acid was found to be practically insignificant. The chlorinated compounds most resistant to alkaline hydrolysis are those containing guaiacyl and veratryl nuclei. Compared to catechols, these structures are less susceptible to oxidation to quinones and thus the oxidative hydrolysis, typical for catechols, can take place only after replacement of methoxyl groups by hydroxyl groups.

There are several reactions that are used in organic chemistry for elimination of chlorine from chlorinated organic compounds. During the nucleophilic hydrolysis of alkyl and aryl chlorides, as well as acid chlorides, the organic chlorine is expelled as chloride and its place is taken by another basic group, such as hydroxyl. Saturated alcohols or organic acids are thus produced.

The dehydrochlorination represents removal of both chlorine and hydrogen from chlorinated organic molecules. Typically, the breaking of C—H and C—Cl occurs in unsymmetrical fashion in the sense that hydrogen relinquishes both electrons to carbon while chlorine retains both electrons. The electrons left behind by hydrogen are available to form the second bond ($\pi$ bond) between the carbon atoms and this results in formation of alkene structure. The energy required for breaking the C-H bond is supplied from (i) formation of a bond between the hydrogen ion and the strongly basic hydroxide ion, (ii) formation of the bond between the two carbon atoms, and (iii) energy of solvation of the chloride ion. Dehydrochlorination proceeds best in alcoholic KOH. The function of this medium is to form the strongly basic alcoholate $C_2H_5OK$ and to solubilize the starting organic compound. In cases when the organic compounds are water soluble, such as chlorinated lignin, the reaction is expected to proceed in an aqueous medium.

It is also known in organic chemistry that the first-order alkaline hydrolysis of $\beta,\beta'$-dichlorodiethyl sulphide (DCDES) is much faster than that of other alkyl halides. This situation is typical of substitution nucleophilic unimolecular $S_N1$ reaction, which proceeds usually in two steps, via organic carbonium cation. In the case of DCDES, the formation of carbonium cation is improbable because it would have to be formed on the primary carbon and this type of cation is highly unstable. Another possibility for elucidating the fast hydrolysis of DCDES is formation of a highly reactive cyclic sulphonium ion. The strongly nucleophilic sulphur is believed to help displace chlorine from the molecule of DCDES.

Attempts to reduce the content of organic chlorine by alkaline treatment have been already made by at least three research groups. Holmberg et al, Svensk Papperstd. 86 (15), R152 (1983) treated $E_1$ ultra filtration (UF) concentrates at temperatures up to 100° C. and pH up to 12.5. About 50% of the organic chlorine was removed after 2 hours treatment. An oxygenation process (150° C., 1.0 MPa, 40-60 minutes) was applied to UF concentrates ($E_1$) by Sun et al TAPPI 72 (9), 209 (1989). The reactor was pressurized with oxygen and mixing at 450-900 rpm to increase the oxygen transfer. Under these conditions, the TOCl removal was 70-80% and colour was removed by 60-70%. Bottger et al "Dechlorination and Biological Treatment of Chlorinated Organic Substances", 4th Int. Symp.—Wood and Pulping Chemistry Paris, France, 1989, studied pretreatment of sulphite chlorination effluent at a pH of 11 and a temperature of 60° C. After 1 hour treatment, the AOX reduction was 50% and this was increased to about 70% following aerobic treatment.

SUMMARY OF THE INVENTION

This invention relates to AOX removal by pH shift of bleach plant effluents, particularly to pH increase of a chlorination effluent at the prevailing temperature of the mill.

In a particular embodiment the invention relates to AOX removal by pH increase of the kraft chlorination ($C_D$) effluent at the prevailing temperature of the mill.

In accordance with one aspect of the invention a process for converting adsorbable organic chlorine in a pulp bleach effluent to inorganic chloride comprises adjusting the pH of a bleached chlorination effluent containing adsorbable organic chlorine to about 6 to about 11 with an alkaline composition in the presence of an agent selected from sulphides, dithionites, stannous chloride and zinc chloride.

In accordance with another aspect of the invention a process for converting adsorbable organic chlorine in a pulp bleach effluent to inorganic chloride comprises: adjusting the pH of a bleached chlorination effluent containing adsorbable organic chlorine to about 6 to about 11 with an alkaline composition and subjecting the pH adjusted effluent to an elevated temperature of about 90 to about 150° C. and an elevated pressure of about 70 kPa to about 475 kPa.

The latter process may be carried out in the presence of the sulphide, dithionite, stannous chloride or zinc chloride.

Adsorbable organic chlorine particularly contemplates chlorinated organic material having a molecular size such that it is adsorbable, for example chlorinated lignin compounds, residues and derivatives, derived from the bleaching of cellulosic pulp with chlorine or chlorine dioxide.

DESCRIPTION OF PREFERRED EMBODIMENT i) pH Adjustment

The adjustment of the pH of the bleached kraft chlorination ($C_D$) effluent, which typically has an acid pH of 1 to 2, can be achieved by addition of alkaline compositions available at the mill, for example, caustic soda, sodium carbonate, lime, limestone, all employed in the mill as well as lime mud and sulphide-containing alkaline compositions, such as alkaline mill condensates, white liquor, green liquor or weak black liquor developed during mill operations. In this case the pH adjustment is typically to a pH of 6 to 11.

The pH adjustment can also be achieved by combining a part of the acidic $C_D$ effluent with other bleached plant effluents including the first caustic extraction ($E_1$) effluent which typically has an alkaline pH of 9 to 12 to achieve a pH of 6.5 to 9, and the alkaline effluent of the hypochlorite (H) stage. The use of alkalinity present in the $E_1$ and H effluents results in lower chemical cost. The remaining part of the $C_D$ effluent can be adjusted to pH 6 to 11, using an alkaline composition as described previously.

The pH adjustment can be carried out at the prevailing ambient temperature at the mill, or at an elevated temperature.

In a preferred embodiment the ambient temperature treatment involves: (i) addition of lime mud to $C_D$ effluent to achieve a pH of 3-4, and (ii) addition of an alkaline composition available at the mill, for example, black liquor, white liquor, green liquor, sodium hydroxide, sodium carbonate or lime at a dose to obtain a pH of about 7 in the equalization tank.

In another preferred embodiment employing a combined $C_D$ and $E_1$ effluent, green liquor is employed as sulphide concentration of 70 to 100 mg/l in the combined effluent, and the treatment is carried out at or above 50° C. for at least 15 minutes.

Another option in the ambient temperature treatment alternative consists of combining the $C_D$ and $E_1$ effluents in a proportion to achieve a pH of the mixture between 6 and 11 in a suitable basin. At these conditions, alkaline hydrolysis and, possibly, precipitation of organic material occur and, upon settling, the supernatant liquid contains less AOX than would be expected from the stoichiometric contribution of the two original effluents.

In a typical bleached kraft mill, the volume and the acidity of $C_D$ effluents is more than that required to achieve the target pH of the mixtures of $C_D$ and $E_1$ effluent. Thus, after combining the two effluents as specified above, there will be a certain flow of the $C_D$ effluent bypassing the treatment in the basin. This part of the $C_D$ effluent is first adjusted in pH to 6-11, using an alkaline composition available at the mill, for example black liquor, white liquor, green liquor, lime mud, lime, limestone, calcium hydroxide, sodium carbonate and/or sodium hydroxide, or other source of alkalinity available at the mill, for example foul evaporator condensates. The pH-adjusted $C_D$ effluent is then allowed to react in a second basin before being discharged to an aerated lagoon for biological treatment.

AOX removal by the above treatment in the presence of the sulphide is accomplished within 5-15 minutes. It will be understood by those skilled in the art that designing both the equalization tank and the basins for a retention time of about 15 minutes to 14 hours is preferred, to ensure a certain buffering capacity. Mild aeration at the entrance of both the basins might be used to enhance the AOX removal by 5-11 percentage points. The rate of aeration is suitably adjusted to allow for settling of excess suspended solids in the overflow areas of both basins. This was demonstrated with sulphide-free alkaline compositions.

In the high temperature treatment alternative, the effluent feed is adjusted to a pH of 6-11 using an alkaline composition as specified above and is introduced into a pressurized reactor. The temperature in the reactor is maintained at an elevated level, suitably 90°-150° C., preferably 110°-140° C., for example by injecting live steam in the reactor. Following exposure to the elevated temperature for 2 to 5 minutes, the treated effluent is withdrawn from the reactor, possibly via a blow tank, and subsequently cooled in a heat exchanger. When the incoming untreated effluent serves as a cooling medium, substantial savings in heat can be attained. A cooling tower can be used for further decrease of the treated effluent temperature, if required.

The high-temperature treatment alternative can be used either for the $C_D$ effluent alone or for the combined $C_D$ and $E_1$ or $C_D$ and $E_1$ and H effluents In the two former cases, AOX removal between 75 and 80% can be achieved when the effluent feed to the reaction vessel is adjusted to a pH of about 7.0. When the pH of the effluent is adjusted to 11.0, AOX removal can attain 88%.

The high-temperature treatment results in a BOD increase of 25-40% which improves the overall removal of pollutants following biological treatment. In addition to the above, effluent colour is reduced by about 50% when calcium oxide or other calcium-containing alkaline compositions are used for pH adjustment of the reactor feed to 7.0. In the latter case, however, substantial amounts of suspended solids will be produced. These solids might have to be separated from the treated effluent before the heat exchanger.

ii) Chemical Agents

The preferred chemical agents are the inorganic sulphides especially alkali metal and alkaline earth metal sulphides; sodium sulphide is especially preferred.

Other agents including inorganic dithionites, for example sodium dithionite and stannous chloride and zinc chloride are found to effect an improvement in AOX removal but the results are inferior to those obtained with sulphides.

Sodium thiosulphate and ferrous sulphate did not show an improvement at all as compared with the process carried out with the use of alkaline compositions alone.

The preferred sodium sulphide is suitably added in an amount of 40-200 mg/l (based on sulphide anion), preferably 70-200 mg/l, and more preferably 100-120 mg/l of effluent and alkaline composition.

The sulphide may also be added in the form of a sulphide-bearing pulp liquor or foul condensates of the mill to achieve the desired addition. Thus when green liquor or white liquor, which contains sulphide, is employed as the alkaline composition, the amount of the green liquor or white liquor required to provide the desired pH adjustment is usually sufficient to provide the required sulphide content.

The sulphide requirement may, of course, be achieved by a combination of sources, for example, weak black liquor employed as alkaline composition in conjunction with addition of sodium sulphide.

BRIEF DESCRIPTION OF DRAWINGS

The invention is further explained by reference to the accompanying drawings in which.

DESCRIPTION OF PREFERRED EMBODIMENTS WITH REFERENCE TO THE DRAWINGS

Figure 1:
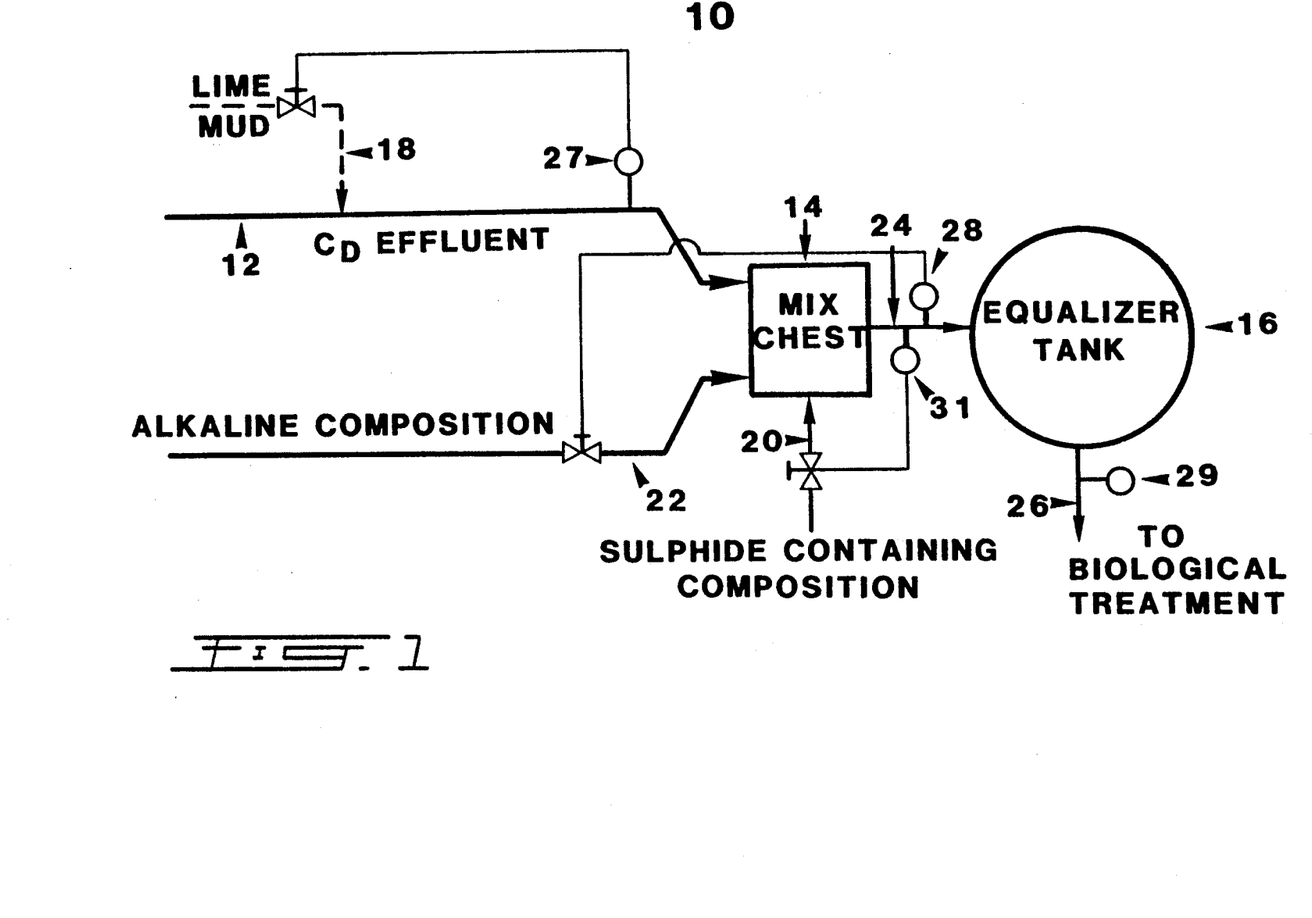
FIG. 1 illustrates schematically a process of the invention at ambient temperature.

With further reference to FIG. 1 there is illustrated a process configuration 10 for alkaline hydrolysis of AOX at ambient temperature and pressure, in accordance with a first embodiment having a $C_D$ effluent line 12, a mixing chamber 14 or chest and an equalizer tank 16. $C_D$ effluent line 12 has a lime mud inlet line 18; and mixing chamber 14 has an inlet line 20 communicating with a source of sulphide containing alkaline composition available at the mill; for example green liquor, white liquor or black liquor; and an inlet line 22 communicating with a source of alkaline composition.

Mixing chamber 14 and equalizer tank 16 are connected by flow line 24 and a line 26 connects equalizer tank 16 to a biological treatment site (not shown).

Flow line 24 has a pH monitor 28; line 12 has a pH monitor 27 and line 26 has a pH monitor 29; and a sulphide monitor 31 communicates with lines 20 and 24.

In operation, bleached plant effluent, originating from the chlorination ($C_D$) is fed along line 12 mixing chamber 14. The $C_D$ effluent typically has a pH of 1-2.

Lime mud is introduced through line 18 with the $C_D$ effluent in line 12 to establish a pH of 3-4. Flow of lime mud in line 18 is controlled responsive to pH monitor 27.

A sulphide containing composition available at the mill is fed to mixing chamber 14 through line 20. The sulphide containing composition may be, for example, weak black liquor, green liquor, white liquor, or foul condensates.

Figure 2:
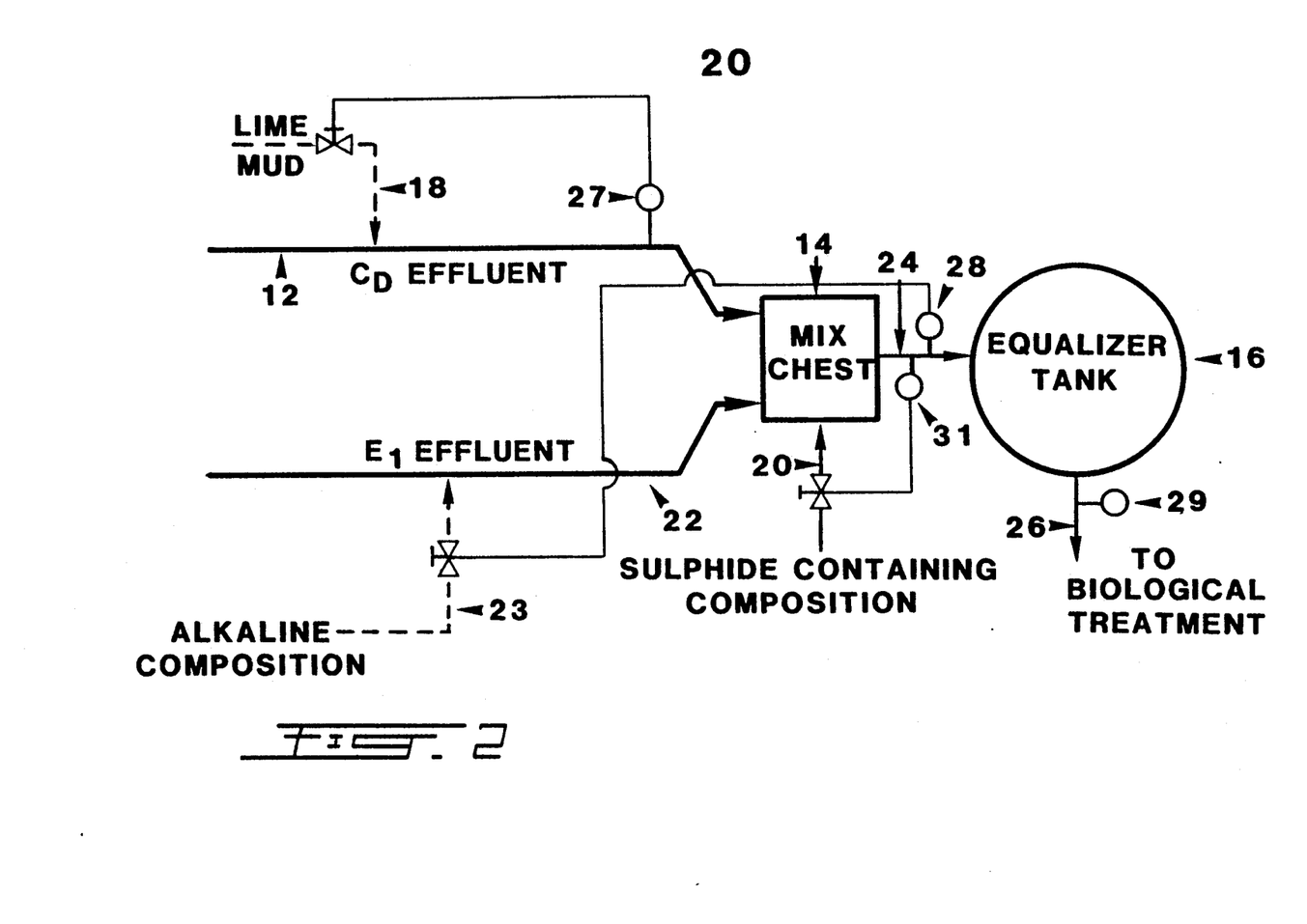
FIG. 2 illustrates schematically a variation of the process of FIG. 1.

The alkaline composition, such as caustic soda, sodium carbonate or lime, is introduced to mixing chamber 14 through line 22. The pH probe 28 is used to control the addition of alkaline composition. With further reference to FIG. 2 there is shown a system 20, a variation of the system 10 of FIG. 1, in which for convenience the same integers are employed. Line 22 supplies $E_1$ effluent as a source of some of the alkalinity needed. Alkaline composition excluding sulphide is fed to line 22 by line 23 at a rate in proportion to the flow of $E_1$ effluent in line 22. The addition of sulphide containing composition through line 20 is controlled by the sulphide probe 31. It would be inappropriate to add the alkaline composition of line 23 directly to the $C_D$ effluent in line 12 as this would hinder or prevent dissolution of lime mud from line 18. At predetermined charges of sulphide containing composition and lime mud, the pH is controlled by adjusting the charge of alkaline composition in line 23.

It is appropriate to maintain residual sulphide downstream of mixing chamber or chest 14 at a minimum to avoid toxicity problems in the subsequent biological treatment. The residual sulphide concentration, if any, in the biological treatment can be lowered by dilution with other waste mill streams.

Figure 3:
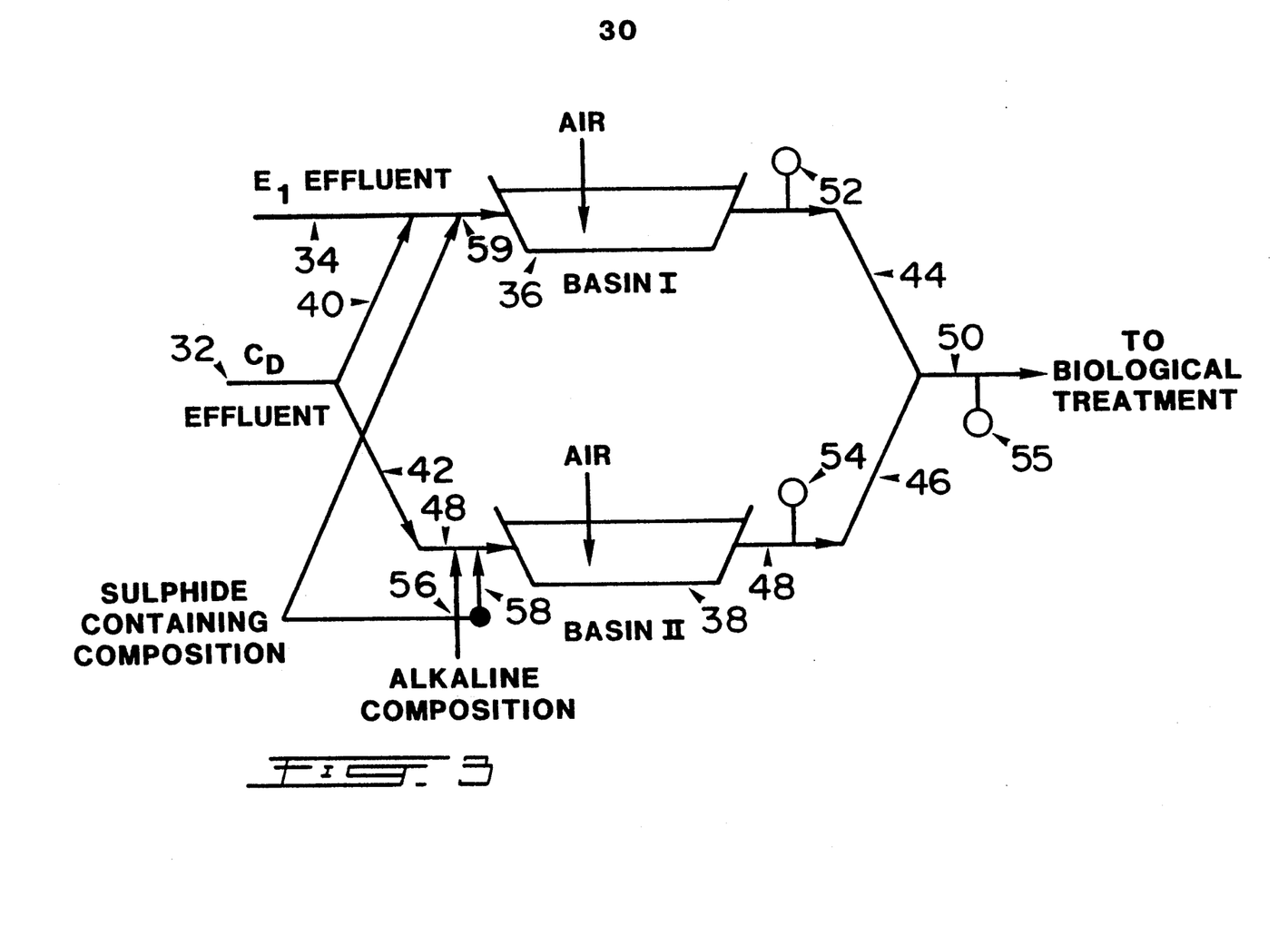
FIG. 3 illustrates schematically a further variation of the process of FIG. 1.

With further reference to FIG. 3, there is illustrated a process configuration 30 for alkaline hydrolysis of AOX at ambient temperature and pressure in accordance with a third embodiment, having a $C_D$ effluent line 32, an $E_1$ effluent line 34, basins 36 and 38, $C_D$ feed lines 40 and 42, out-flow feed lines 44 and 46, a by-pass line 48, and an out-flow line 50.

pH probes 52, 54 and 55 are disposed in lines 34, 48 and 50 downstream of basins 36 and 38.

Alkaline line 56 upstream of basin 38 communicates with by-pass line 48, and sulphide lines 58 and 59 communicate with lines 48 and 34, upstream of basins 38 and 36, respectively.

In operation, $C_D$ effluent in line 32 is fed into $C_D$ feed lines 40 and 42 to provide a combined $C_D$ and $E_1$ effluent in line 34 in suitable proportions to achieve a mixture in basin 36 having a pH of 6 to 11, the pH being monitored by pH probe 52. Sulphide is introduced to the combined effluent at line 59.

Under these conditions alkaline hydrolysis, in the presence of sulphide, and possibly precipitation of organic material, occurs in basin 36 and, upon settling, the supernatant liquid contains less AOX than would be expected from the stoichiometric contribution of the $C_D$ and $E_1$ effluents in basin 36.

A portion of the $C_D$ effluent is fed to by-pass line 48 via feed line 42 because the volume and acidity of $C_D$ effluents at the bleached kraft mill is more than that required to achieve the desired pH in the combined effluent in basin 36.

An alkaline composition is added to the portion of the $C_D$ effluent in by-pass line 48 through line 56 to achieve a pH of 6–11 which is monitored by pH probe 54. The sulphide containing composition at lines 58 and 59 is typically one available at the mill, for example weak black liquor, white liquor, green liquor, or foul condensates. The pH adjusted $C_D$ effluent is subject to alkaline hydrolysis in basin 38.

The treated discharge effluent from basins 36 and 38 is fed through out-flow feed lines 44 and 46, respectively, to out-flow line 50 and thence to a biological treatment (not shown). The pH probe 55 is used to monitor the pH of effluents discharged to the biological unit.

Mild aeration in basins 36 and 38 is beneficial as described previously.

Figure 4:
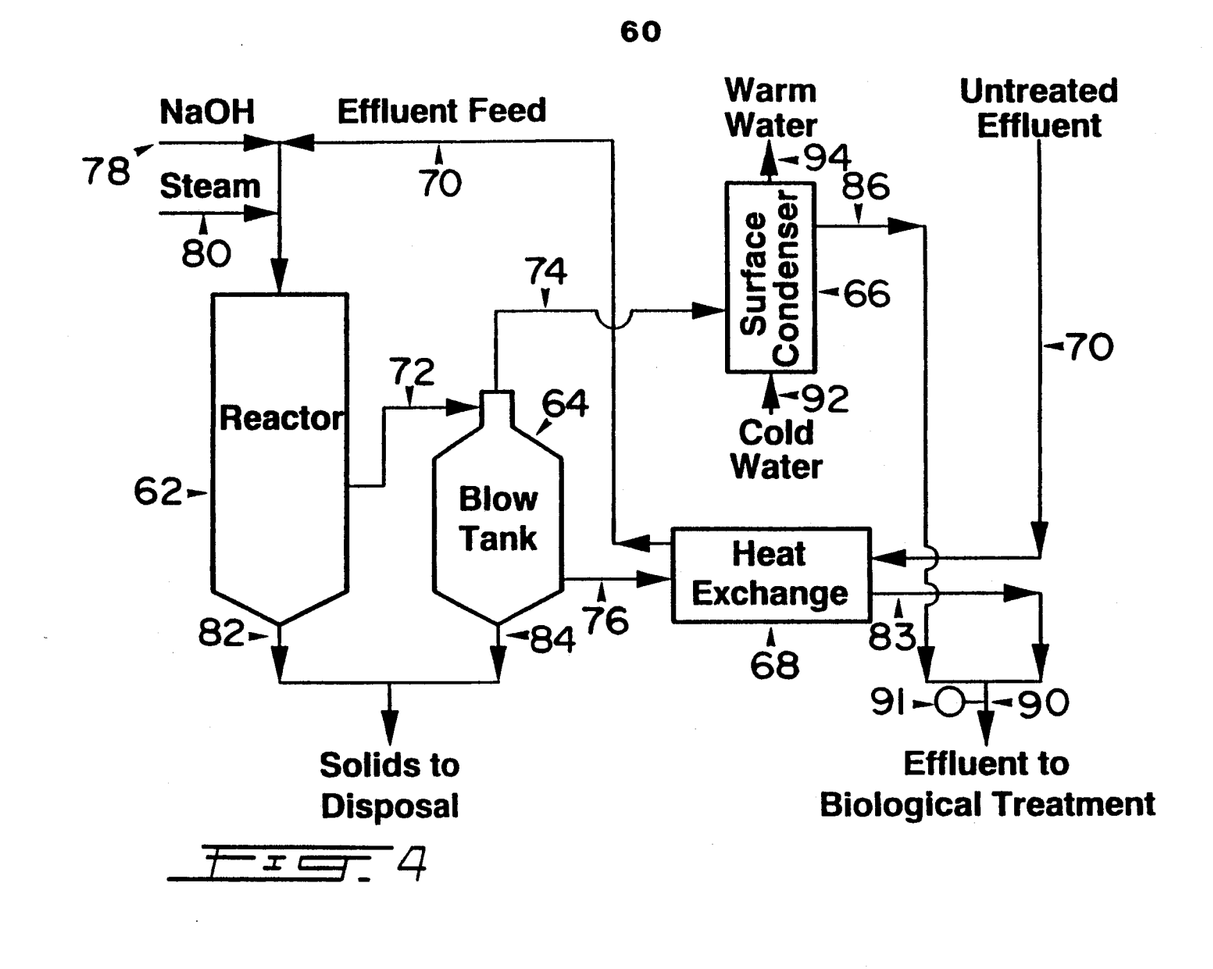
FIG. 4 illustrates schematically a process of the invention at elevated temperature and pressure.

With further reference to FIG. 4, a process system 60 has a reactor 62, a blow tank 64, a surface condenser 66, and a heat exchanger 68.

Inlet feed line 70 feeds reactor 62. Line 72 connects reactor 62 and blow tank 64. Line 74 connects blow tank 64 and surface condenser 66 and line 76 connects blow tank 64 and heat exchanger 68.

Alkaline composition line 78 and steam line 80 feed into inlet feed line 70 upstream of reactor 62.

Reactor 62 and blow tank 64 have solids out-flow lines 82 and 84, respectively.

Surface condenser 66 has an out-flow line 86 and heat exchanger 68 has an out-flow line 83. Lines 86 and 88 feed discharge line 90 which communicates with a biological treatment installation (not shown). A pH probe 91 monitors the pH of effluent reaching the lagoon.

Surface condenser 66 has a cold water inlet 92 and a warm water outlet 94.

The process system 60 for treatment at elevated temperature and pressure can be used for $C_D$ effluent alone, or a combined $C_D$ and $E_1$ effluent or a combined $C_D$, $E_1$ and H effluent.

The untreated effluent is fed via line 70 to reactor 62, an alkaline composition and steam being injected into line 70 via lines 78 and 80, respectively.

The reactor 62 is pressurized and the temperature is maintained at 110°–150° C. by the steam injection through line 80. The effluent has a residence time in reactor 62 of about 2 to 5 minutes and is fed via blow tank 64 to heat exchanger 68. Vapors in blow tank 64 are fed to surface condensers where they are condensed and fed to discharge line 90.

The treated effluent is cooled in heat exchanger 68 and for this purpose untreated effluent in feed line 70 may serve as a cooling medium. The treated effluent is fed through line 83 to discharge line 90.

Waste solids are removed from reactor 62 and blow tank 64 through solids out-flow lines 82 and 84, for disposal.

Condensation of vapors in surface condenser 66 is achieved with a feed of cold water through line 92 and removal of warm or heated water through line 94.

Figure 5:
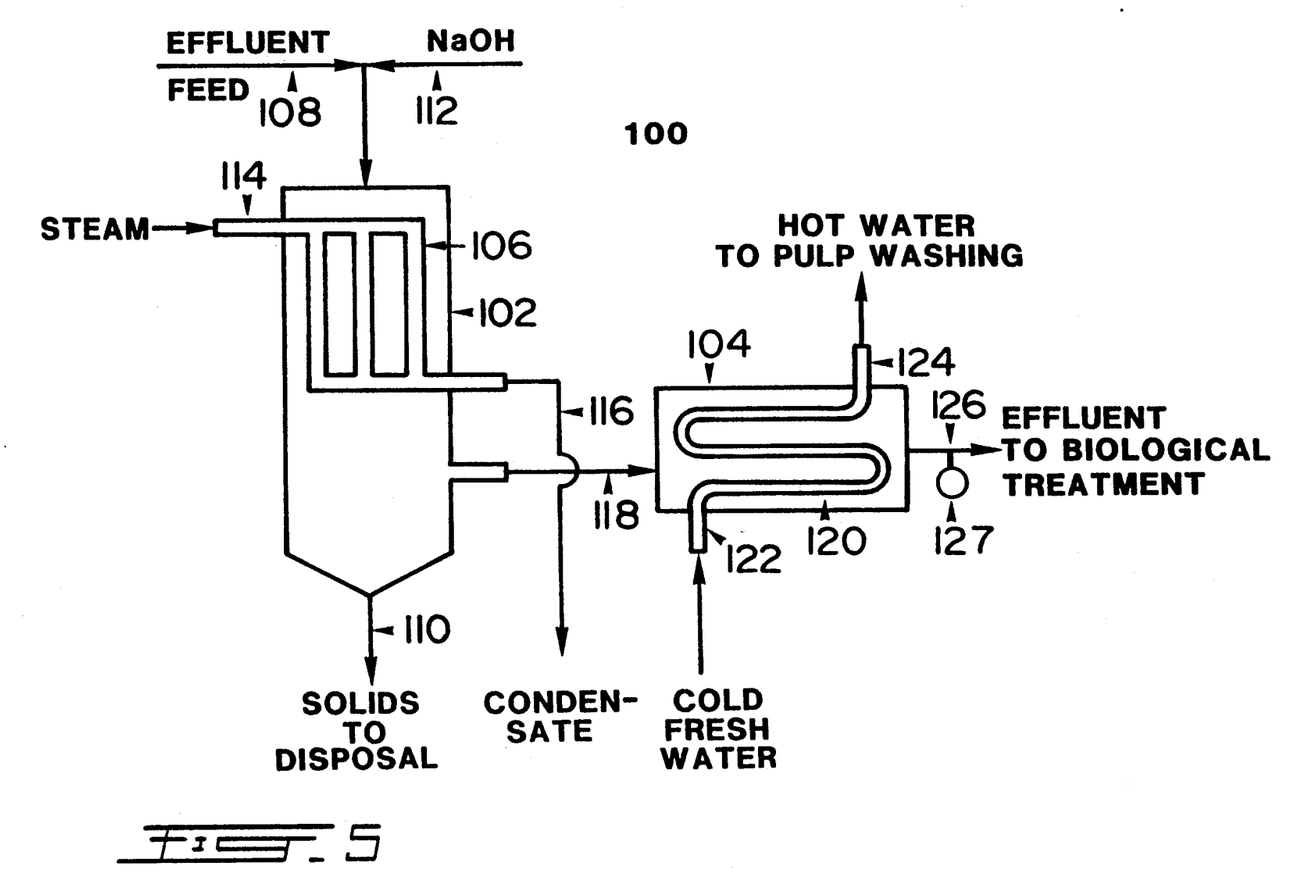
FIG. 5 illustrates schematically a variation of the process of FIG. 4.

With further reference to FIG. 5, a process system 100 comprises a reactor 102 and a condenser 104.

Reactor 102 has a steam heater 106, an effluent feed line 108 and a solids out-flow line 110.

Alkaline composition feed line 112 feeds into line 108.

Steam heater 106 has a steam inlet 114 and a condensate outlet 116.

Line 118 connects reactor 102 and condenser 104.

Condenser 104 has a cooling line 120 with an inlet 122 for cold water and an outlet 124 for heated water.

Effluent out-flow line 126 connects condenser 104 with a biological treatment plant (not shown). The pH probe 127 is used to monitor the pH of effluents to the lagoon.

The operation is similar to that described with reference to FIG. 4.

Untreated effluent enters pressurized reactor 102 through line 108; and the effluent contains an alkaline composition injected through line 112.

The effluent is subjected to an elevated temperature, typically 110°–150° C., by the steam heater 106. Fresh steam is continuously injected through inlet 114 and condensed water is removed through outlet 116.

Treated effluent is fed from reactor 102, after a residence time of 2 to 5 minutes, through line 118 to condenser 104. The treated effluent is cooled in condenser 104 by cold water fed through inlet 122 into cooling line 120. The heated water removed from cooling line 120 through outlet 124 may be used for pulp washing in the mill.

The treated effluent is fed through out-flow line 126 to a biological treatment plant.

Solids in reactor 102 are removed through out-flow line 110.

EXAMPLE 1

A mixture containing a 70% by vol. of $C_D$ effluent and 30% by volume of $E_1$ effluent was prepared, to represent the total effluent flow from A or B bleach plants (both softwood operations). One liter beakers were then filled up with 500 ml of the above effluent mixtures.

Immediately after pH adjustment of these samples to 7.0 and 11.0 with weak black liquor or NaOH, the samples were briefly reheated on a hotplate to 50° C. and maintained at the temperature for 15 minutes. Each sample was also stirred continuously during treatment, using a magnetic stirrer. Samples that were adjusted up to pH 11.0 with WBL or NaOH were promptly neutralized to pH 7.0 (with $H_2SO_4$) after the 15-minute treatment period, then chilled. At the end of the 15-minutes treatment period, samples were quickly chilled in a deep freeze to 0°–4° C. then transferred to a refrigerator. The samples were sent the following day in an ice-packed cooler for AOX analysis. WBL used in this experiment was filtered on a sintered glass crucible (to remove fibre) before use and had a filtered Baume of 13.6° Be. Concentrated NaOH (50%) was used for NaOH treatment of samples.

The five separate runs performed with effluent samples from mills A and B have confirmed that AOX concentration was reduced by an average of 49% with WBL addition to final bleach plant effluent pH of 7, compared to an average 15% with identical NaOH treatment (refer to Table 1). WBL is therefore 3.3 times more effective at AOX removal than NaOH, for treatment of bleach plant effluent to pH 7.0. At pH of 11.0, the average AOX removal with WBL was 60% as opposed to 43% obtained with NaOH alone.

EXAMPLE 2

Several chemical agents were tested for AOX removal from $C_D$ effluent (mill C, hardwood). These included $Na_2S$, $Na_2S_2O_3$, $Na_2S_2O_4$, $FeSO_4$, $SnCl_2$ and $ZnCl_2$. In most tests, samples of $C_D$ effluent were adjusted to pH 7.0 (using NaOH), the agent was added (dose, 1g/L, based on anhydrous substance) and pH readjusted to 7.0 (NaOH). In test with $Na_2S$, the $C_D$ effluent was added to $Na_2S$, to prevent release of $H_2S$. Homogenized samples were taken in all cases for AOX analyses. All test were carried out at 45° C.

The results (see Table 2) show AOX removal of 15% and 53%, when the treatment was performed at pH=7 with NaOH alone and NaOH +$Na_2S$, respectively. Further increase of AOX removal to 67% was obtained when the NaOH+$Na_2S$ treatment was carried out at pH of 10.

The other agents tested can be classified into two groups. The first group, including $Na_2S_2O_3$ and $FeSO_4$, produced AOX removal between 12 and 16%, which was comparable to that attained with NaOH alone (15%). The remaining compounds ($Na_2S_2O_4$, $SnCl_2$ and $ZnCl_2$) reduced AOX to a higher extent (24-26%) than NaOH alone, but were clearly inferior to sodium sulphide.

EXAMPLE 3

In this example, carried out at 40° C., the effect of $Na_2S$ was determined. When $Na_2S$ is added to the highly acidic $C_D$ effluent (ph 1.6-1.9), release of $H_2S$ occurs. To prevent $H_2S$ formation, the target amount of $Na_2S$ (as well as additional NaOH) were placed in a beaker and a measured volume of $C_D$ efflluent (mill C, hardwood) was added. The $Na_2S$ grade solution ($Na_2$, 176.6g/L; NaOH, 44.7g/L), was one used routinely for preparation of kraft cooking liquor. The dose of NaOH was adjusted so as to achieve pH 7.0 upon addition of $C_D$ effluent. The mixture was then mixed gently for 15 minutes using a 6-paddle mixer. Aliquots of homogenized samples were taken and immediately stabilized by addition of $HNO_3$ to pH 2.0. AOX analyses were performed within 24 hours.

The results obtained (see Table 3) show a substantial increase of AOX removal in samples treated with addition of $Na_2S$. The pH adjustment to 7.0 with NaOH alone resulted in AOX reduction of 25% and this was increased to 44% and 50%, by addition of 82 mg/L and 205 mg/L of $S^{2-}$, respectively. It is also demonstrated that (i) sulphide is consumed during the alkaline hydrolysis, possibly by reacting with organic compounds present in $C_D$ effluent or by other reaction(s). However, our results suggest, that sulphide is not converted to sulphate or sulphite (refer to Table 3).

EXAMPLE 4

Samples of $C_D$ and $E_1$ effluents (both softwood and hardwood) were taken from the respective seal tanks and mixed in various proportions immediately after sampling at 40°-70° C. The volume of this mixture was kept constant, at 1 L. Samples from the softwood mill (D) were stabilized by adjusting the pH to 2.0 with nitric acid, about two hours after mixing. This method has been recommended for preservation of biologically treated effluents during sample shipping. Samples from the local hardwood mill (C) were analyzed for AOX without $HNO_3$ preservation. The AOX values expected to be present in the effluent mixtures were calculated from AOX contents of the original $C_D$ and $E_1$ effluents and compared to those determined by AOX analyses of the effluent mixtures. As documented in Table 4, AOX reductions between 8% and 25% were observed when the $C_D$ effluent fraction in the final mixture was between 0.2 and 0.4.

EXAMPLE 5

To improve the AOX removal at neutral pH, tests with softwood bleach plant effluents (mill E, softwood) were performed at increased temperatures. At pH of 7.0 and temperature of 150C. (pressure, 475 kPa), 28% to 50% of AOX was removed from $C_D$ effluent, $E_1$ effluent, and $C_D$ +$E_1$ mixture, simply by heating up the samples followed up by immediate cooling to room temperature (refer to Table 5). Maintaining the target temperature for 15 minutes, enhanced the AOX further with the three effluent samples tested, to about 55-75%.

To determine the fate of AOX during this treatment, samples treated for 0 and 5 minutes were analyzed for inorganic chloride. Results obtained showed that, for reaction time of 0 minutes, the AOX removed was comparable to the chloride increase for all three types of effluent samples tested. However, at reaction time of 5 minutes, the AOX removed was greater than the chloride increase. The latter observation is indicative of additional AOX removal by precipitation of lignin. It appears thus that in our tests the alkaline hydrolysis was the first reaction occurring before the lignin precipitation. This finding could be used to minimize the suspended solids formation during the hydrolysis and thus avoid possible solids deposits in the reaction vessel.

The alkaline hydrolysis at 150 C. for 5 minutes resulted in increased BOD (25-40%, over the level in original effluents) with all effluent samples tested. Thus a better overall removal of pollutants would be expected following biological treatment. An increase of colour was observed particularly with the $C_D$ effluent (128% to 159%, over original level, for pH adjustment with NaOH and CaO, respectively). With the $C_D$ +$E_1$ mixture, a colour removal of 49% occurred when the pH adjustment (to 7.0) was made with CaO. This was accompanied by a substantial increase of total suspended solids (577%, over the original level).

EXAMPLE 6

Samples of $C_D$ effluent prepared in the laboratory were treated at various pH levels with NaOH and NaOH/$Na_2S$. Initial pH and final pH after treatment were measured in each case. As indicated in Table 6, the AOX reduction is considerably more pronounced in the presence of sulphide. At pH 8, the percent AOX reduction with sulphide (95 mg/L as $S^{2-}$) is 50.6% compared with 21.4% with caustic alone. Most of the AOX reduction is probably due to the removal of low molecular weight chlorinated organics which constitute the major portion of the AOX in the $C_D$ effluent.

The data in Table 6 also show that the caustic consumption is lower when sulphide is used due to the alkali contribution from $Na_2S$. For example, the pHs 8 and 11, the reduction in caustic consumption is 15 and 13%, respectively. It was also noted that the final pH att the end of the 20 min. treatment was significantly lower than the initial pH.

The effect of sulphide concentration on AOX reduction was also determined at a fixed initial pH of 7.6 (Table 7). The AOX reduction rises rapidly at first and then levels off at a sulphide concentration of about 100 mg/L.

EXAMPLE 7

Replacement of sodium hydroxide with sodium carbonate produced somewhat larger AOX reduction (Table 8), particularly at higher pH. This may be due to the buffering capacity of $NA_2CO_3$ which results in maintaining the final pH closer to its initial value, as indicated in Table 8. As noted in Example 6, when sodium hydroxide is used, the pH drops significantly during treatment, and therefore the full potential of alkaline hydrolysis may not be realized.

EXAMPLE 8

Chlorination effluents from a softwoods mill were treated at various pH levels with NaOH, NaOH/$Na_2S$, $Na_2CO_3$ and $Na_2CO_3$/$Na_2S$. The data (Tables 9 and 10) show that AOX reductions parallel those observed with the laboratory sample. It was noted, however, that the pH reduction after treatment with NaOH or with NaOH/$Na_2S$ was not a pronounced as with the laboratory sample and, in some cases, the final pH was even slightly higher than the initial pH. It appears, therefore, that the mill effluent has more buffering capacity than the laboratory sample.

EXAMPLE 9

Experiments with $C_D$/E blends from the same mill as in Example 8 included treatments at various pH levels with NaOH, NaOH/$Na_2S$, $Na_2CO_3$/$Na_2S$, weak black liquor (WBL), oxidized WBL, white liquor and green liquor. Details of treatment conditions, pH levels and AOX results are given in Table 11. Sulphide concentrations in the blend, contributed by each liquor, are also included in the table. For each pH level, the AOX reduction appears to be related to the sulphide content in the treated sample. This is more clearly indicated in Table 12 which shows the sulphide concentration and percent AOX reduction at the three initial pH levels 5, 8 and 10.

At pH 5, the highest AOX reduction is observed with NaOH/$Na_2S$ and $Na_2CO_3$/$Na_2S$, presumably because of the higher sulphide levels (98 mg/L) compared with WBL, white or green liquors. The treatment with oxidized WBL contributes only 3.6 mg/L of sulphide, and, consequently, produces the lowest AOX reduction (13.1%).

At pH 8, the amount of sulphide contributed by the WBL, green and white liquors are higher because more liquor is added. At this pH, the AOX reduction is approximately the same for treatment with NaOH/$Na_2S$, $Na_2CO_3$/$Na_2S$, WBL and green liquor. However, it is lower with white liquor, probably due to its smaller contribution to the sulphide level (51 mg/L compared with 83 mg/L for green liquor). Because of the higher alkalinity of white liquor compared with green liquor, less volume is required to reach to same pH level. The oxidized WBL gives a much lower AOX reduction, as expected, followed by the NaOH treated sample, containing no sulphide. The results suggest that there is a threshold concentration of sulphide necessary for optimum AOX reduction. This threshold concentration appears to be between 50-100 mg/L, in accordance with results on the laboratory sample (Table 7).

At pH 10, both WBL and green liquor produce the highest AOX reduction, probably because of their higher contribution to the sulphide level. Treatments with NaOH/$Na_2S$, $Na_2CO_3$/$Na_2S$, white liquor, and oxidized WBL (with its much lower sulphide concentration all give about the same AOX reduction. Treatment with NaOH only produces an even lower AOX reduction, but the difference here is not as large as that at pH 8. It appears that at this high pH level, the difference in effectiveness of NaOH and NaOH/$Na_2S$ treatments is less pronounced than at neutral pH, and, therefore, the effect of sulphide is not at significant. The type of sulphur species may also be important for AOX reduction. At intermediate pH, the sulphide is largely in the form of $HS^-$, whereas at pH 10 it is mostly present as $S^{2-}$. Further studies should help elucidate the mechanism of this process.

Based on the AOX reduction observed with the mill $C_D$ effluent treated with NaOH, NaOH/NaS and $Na_2CO_3$/$Na_2S$, the expected AOX of the blend was calculated—on the assumption that all of the AOX reduction occurred in the $C_D$ effluent—and the values compared with actual AOX measured on the blend. The results (Table 13) show that the expected AOX values are a little higher than the measured AOX, particularly at pH 8. This suggests that there is a small contribution from the E-stage effluent to the overall AOX reduction. It appears that this is largely due to a reduction of low molecular weight chlorinated organics which make up a small proportion of the total chlorinated organics in the E-stage effluent. However, more work is required to confirm this hypothesis. The estimated contribution from E-stage at pH 8 and 11 is included in the Table. At pH 8, the percent contribution is 8-10% and at pH 11, it is only 1-4%. This suggests that there is some benefit of performing the treatment on the $C_D$/E blend rather than on the $C_D$ effluent separately.

EXAMPLE 10

To assess the effect of lime mud pretreatment on green or white liquor addition and AOX reduction, we added lime mud to the $C_D$/E blend to a pH of 3.4, followed by treatment with white or green liquor to a pH of about 8. The results were compared to those obtained without lime mud pretreatment. As indicated in Table 14, the addition of lime mud reduces the white and green liquors requirements by 25 and 16%, respectively. However, this also results in a similar decrease in the amount of sulphide present in the sample, which could reduce the effectiveness of the treatment. In the case described in Table 14, the AOX reduction was not significantly affected by lime mud addition. Although there may be some advantage to pretreating with lime mud because of a reduction in the amounts of white or green liquor required, there are also potential drawbacks including a reduction in effectiveness of the treatment due to a decrease in sulphide level, and an increase in suspended solids.

TABLE 1

AOX removal from $C_D$ and $E_1$ effluents using WBL and NaOH.

| Mill | pH $C_D + E_1$[1] Effluent | AOX $C_D + E_1$[1] mg/L | AOX Removal, % pH = 7.0 WBL | AOX Removal, % pH = 7.0 NaOH | AOX Removal, % pH = 11.0 WBL | AOX Removal, % pH = 11.0 NaOH |
|---|---|---|---|---|---|---|
| A-1 | 1.4 | 48 | 48 | 28 | 47 | 45 |
| A-2 | 2.1 | 45 | 56 | 13 | 71 | 47 |
| A-3 | 2.4 | 53 | 35 | NA | 48 | NA |
| B-1 | 1.9 | 53 | 62 | 13 | 79 | 49 |
| B-2 | 2.3 | 66 | 42 | 6 | 53 | 29 |
| Average | 2.0 | 53 | 49 | 15 | 60 | 43 |

Notes:
[1] $C_D:E_1 = 70:30$

TABLE 2

The effect of chemical agents on AOX removal from $C_D$ effluent.

| Additive | Dosage, g/L NaOH | Dosage, g/L Chemical agent[1] | $pH_0$[2] | $pH_{15}$[3] | AOX[4], mg/L | AOX Removal[5], % |
|---|---|---|---|---|---|---|
| NaOH | 0.93 | — | 7.1 | 6.8 | 89 | 15 |
| NaOH + $Na_2S$ | 0.68 | 0.98 | 10.0 | 9.6 | 35 | 67 |
| NaOH + $Na_2S$ | 0.29 | 0.98 | 7.0 | 7.1 | 49 | 53 |
| NaOH + $Na_2S_2O_3$ | 0.93 | 0.99 | 7.0 | 6.9 | 92 | 12 |
| NaOH + $Na_2S_2O_4$ | 1.06 | 1.00 | 7.0 | 6.7 | 77 | 26 |
| NaOH + $FeSO_4$ | 1.17 | 1.00 | 7.0 | 6.1 | 88 | 16 |
| NaOH + $SnCl_2$ | 1.32 | 1.00 | 7.1 | 6.6 | 79 | 25 |
| NaOH + $ZnCl_2$ | 1.29 | 1.00 | 7.0 | 6.8 | 80 | 24 |

Notes:
[1] Dose based on anhydrous substance.
[2] pH before addition of chemical agent.
[3] pH after chemical agent addition and mixing (15 minutes)
[4] Analyzed on homogenized samples (including solids) and stabilized by $HNO_3$ to pH of 2.0.
[5] AOX of original $C_D$ effluent, 105 mg/L.

TABLE 3

The effect of $Na_2S$ sulphide dose on AOX removal from $C_D$ effluent.

| Dose, mg/L, of NaOH | Dose, mg/L, of $S^{2-}$ | AOX, mg/L Orig. | AOX, mg/L Final | AOX, mg/L Difference | $S^{2-}$, mg/L Final | $S^{2-}$, mg/L Difference[1] | $SO_4^{2-}$ [2] mg/L Final |
|---|---|---|---|---|---|---|---|
| 0 | 0 | 110 | 110 | 0 | 0 | 0 | 297 |
| 910 | 0 | 110 | 82 | 28 | 0 | 0 | 269 |
| 830 | 41 | 110 | 72 | 38 | 28 | 13 | 266 |
| 770 | 82 | 110 | 62 | 48 | 23 | 59 | 272 |
| 600 | 205 | 110 | 55 | 55 | 72 | 133 | 272 |
| 290 | 410 | 110 | 54 | 56 | 196 | 214 | 281 |

Notes:
[1] Calculated as: (Sulphide dose) − (Sulphide in Final Effluent).
[2] Determined by ion chromatography method. Sulphite was not detected in any of the samples tested for sulphate.

TABLE 5

AOX removal from softwood bleach plant effluents by alkaline hydrolysis at pH = 7.0 and temperature of 150° C.

| Effluent | Duration[1], min | AOX Removal[2], % NaOH | AOX Removal[2], % CaO | AOX Removed[2], mg/L NaOH | AOX Removed[2], mg/L CaO | $Cl^-$ Increase[3], mg/L NaOH | $Cl^-$ Increase[3], mg/L CaO |
|---|---|---|---|---|---|---|---|
| $C_D$ | 0 | 50 | 48 | 41 | 39 | 34 | 40 |
|  | 5 | 69 | 66 | 57 | 55 | 35 | 31 |
|  | 15 | 75 | 74 | NA | NA | NA | NA |
| $E_1$ | 0 | 28 | NA | 45 | NA | 56 | NA |
|  | 5 | 46 | NA | 91 | NA | 76 | NA |
|  | 15 | 55 | NA | NA | NA | NA | NA |
| $C_D + E_1$ | 0 | 44 | 41 | 61 | 56 | 53 | 45 |
|  | 5 | 57 | 54 | 80 | 75 | 50 | 57 |
|  | 15 | 62 | 63 | NA | NA | NA | NA |

Notes:
[1] Duration of effluent exposure to 150° C.
[2] Original AOX 83, 204 and 139 mg/L for $C_D$, $E_1$ and $C_D + E_1$ samples, respectively.
[3] Original $Cl^-$ contents 950, 1257 and 1078 mg/L for $C_D$, $E_1$ and $C_D + E_1$ samples, respectively.

TABLE 4

AOX removal by mixing $C_D$ and $E_1$ effluents in various volumetric proportions.

| Effluent Fraction $C_D$ | Effluent Fraction $E_1$ | Softwood Effluents pH | Softwood Effluents AOX, mg/L Orig. | Softwood Effluents AOX, mg/L Final | Softwood Effluents Removal, % | Hardwood Effluents pH | Hardwood Effluents AOX, mg/L Orig. | Hardwood Effluents AOX, mg/L Final | Hardwood Effluents Removal, % |
|---|---|---|---|---|---|---|---|---|---|
| 0 | 1.0 | 11.8 | 154 | 154 | 0 | 10.5 | 100 | 100 | 0 |
| 0.1 | 0.9 | 11.6 | 164 | 160 | 3 | 9.6 | 106 | 82 | 23 |
| 0.2 | 0.8 | 11.4 | 173 | 160 | 8 | 7.8 | 112 | 84 | 25 |
| 0.3 | 0.7 | 11.1 | 183 | 154 | 16 | 6.3 | 119 | 96 | 19 |
| 0.4 | 0.6 | 10.1 | 192 | 165 | 14 | 5.4 | 125 | 100 | 20 |
| 0.5 | 0.5 | 7.2 | 202 | 192 | 5 | 3.9 | 131 | 115 | 12 |
| 0.6 | 0.4 | 5.8 | 212 | 206 | 3 | 2.8 | 137 | 135 | 2 |
| 0.7 | 0.3 | 4.7 | 221 | 219 | 1 | 2.3 | 143 | 139 | 3 |
| 0.8 | 0.2 | 2.3 | 231 | 230 | 0 | 2.0 | 150 | 150 | 0 |
| 0.9 | 0.1 | 2.0 | 240 | 240 | 0 | 1.9 | 156 | 153 | 2 |
| 1.0 | 0 | 1.8 | 250 | 250 | 0 | 1.8 | 162 | 162 | 0 |

TABLE 6

Effect of NaOH and NaOH/Na₂S treatments on AOX reduction

| Sample: | Laboratory chlorination effluent |
| --- | --- |
| Initial AOX: | 54.7 mg/L |
| Initial pH: | 1.62 |
| Treatment conditions: | 60° C. for 20 min |

| Treatment | Initial pH | Final pH | NaOH (g/L) | S²⁻ (mg/L) | AOX (mg/L) | % AOX reduction |
| --- | --- | --- | --- | --- | --- | --- |
| NaOH | 4.2 | 3.9 | 0.816 | — | 48.8 | 10.8 |
|  | 8.0 | 6.2 | 0.852 | — | 43.0 | 21.4 |
|  | 11.0 | 7.8 | 0.940 | — | 33.3 | 39.1 |
| NaOH/Na₂S | 4.6 | 3.4 | 0.584 | 95 | 37.7 | 31.1 |
|  | 6.4 | 4.4 | 0.632 | 95 | 32.2 | 41.1 |
|  | 8.0 | 7.3 | 0.720 | 95 | 27.0 | 50.6 |
|  | 11.0 | 9.4 | 0.824 | 95 | 25.8 | 52.8 |

TABLE 7

Effect of sulphide concentration on AOX reduction

| Sample: | laboratory chlorination effluent |
| --- | --- |
| Initial AOX: | 55.6 mg/L |
| Initial pH: | 1.62 |
| Treatment conditions: | 60° C. for 20 min |

| Initial pH | Final pH | S²⁻ (mg/L) | NaOH (g/L) | AOX (mg/L) | % AOX reduction |
| --- | --- | --- | --- | --- | --- |
| 7.5 | 6.1 | 0 | 0.848 | 44.0 | 20.9 |
| 7.6 | 6.4 | 49.6 | 0.760 | 33.0 | 40.6 |
| 7.6 | 7.6 | 99.1 | 0.656 | 27.3 | 50.9 |
| 7.6 | 8.1 | 173 | 0.500 | 26.1 | 53.1 |
| 7.6 | 8.0 | 248 | 0.342 | 25.2 | 54.7 |

TABLE 8

Effect of substituting Na₂CO₃ for NaOH

| Sample: | laboratory chlorination effluent |
| --- | --- |
| Initial AOX: | 55.0 mg/L (Na₂CO₃) and 54.8 mg/L (Na₂CO₃/Na₂S) |
| Inital pH: | 1.62 |
| Treatment conditions: | 60° C. for 20 min |

| Treatment | Initial pH | Final pH | Na₂CO₃ (g/L) | S²⁻ (mg/L) | AOX (mg/L) | % AOX reduction |
| --- | --- | --- | --- | --- | --- | --- |
| Na₂CO₃ | 5.5 | 6.0 | 1.27 | — | 45.8 | 16.7 |
|  | 8.5 | 7.9 | 2.15 | — | 40.4 | 26.6 |
|  | 10.2 | 10.0 | 4.74 | — | 26.1 | 52.6 |
| Na₂CO₃/Na₂S | 5.6 | 6.0 | 0.917 | 80 | 28.8 | 47.6 |
|  | 8.2 | 7.6 | 1.69 | 80 | 26.0 | 52.7 |
|  | 10.2 | 10.0 | 4.73 | 80 | 23.3 | 57.6 |

TABLE 9

Effect of NaOH and NaOH/Na₂S treatments on AOX reduction

| Sample: | mill chlorination effluent |
| --- | --- |
| Initial AOX: | 39.0 mg/L |
| Initial pH: | 1.72 |
| Treatment conditions: | 50° C. for 20 min |

| Treatment | Initial pH | Final pH | NaOH (g/L) | S²⁻ (mg/L) | AOX (mg/L) | % AOX reduction |
| --- | --- | --- | --- | --- | --- | --- |
| NaOH | 4.1 | 4.0 | 0.692 | — | 36.0 | 7.7 |
|  | 8.2 | 6.9 | 0.752 | — | 33.2 | 14.9 |
|  | 11.4 | 11.0 | 0.876 | — | 21.5 | 44.9 |
| NaOH/Na₂S | 4.1 | 3.6 | 0.416 | 101 | 26.7 | 31.5 |
|  | 8.1 | 9.3 | 0.600 | 101 | 19.9 | 49.0 |
|  | 11.4 | 11.2 | 0.732 | 101 | 71.2 | 55.9 |

TABLE 10

Effect of Na₂CO₃ and Na₂CO₃/Na₂S treatment on AOX reduction

| Sample: | mill chlorination effluent |
| --- | --- |
| Initial AOX: | 38.2 mg/L (Na₂CO₃) and 40.2 mg/L (Na₂CO₃/Na₂S) |
| Initial pH: | 1.72 |
| Treatment conditions: | 50° C. for 20 min |

| Treatment | Initial pH | Final pH | Na₂CO₃ (g/L) | S²⁻ (mg/L) | AOX (mg/L) | % AOX reduction |
| --- | --- | --- | --- | --- | --- | --- |
| Na₂CO₃ | 4.2 | 4.2 | 0.971 | — | 36.4 | 4.7 |
|  | 7.9 | 7.7 | 1.86 | — | 31.8 | 16.8 |
|  | 10.4 | 10.3 | 4.82 | — | 22.8 | 40.3 |
| Na₂CO₃/Na₂S | 4.2 | 3.9 | 0.598 | 99 | 2.65 | 34.1 |
|  | 8.3 | 8.6 | 1.55 | 99 | 20.6 | 48.8 |
|  | 10.4 | 10.3 | 3.89 | 99 | 17.6 | 56.2 |

TABLE 11

Details of treatment conditions and AOX levels of C_D/E blend

| Sample: | mill C_D/E (70:30) blend |
| --- | --- |
| Initial AOX in C_D effluent: | 40.2 mg/L |
| Initial AOX in E effluent: | 74.6 mg/L |
| Treatment conditions: | 50° C. for 20 min |
| [NaOH] and [Na₂CO₃]: | 0.10 M |

| Treatment | Liquor addition to blend (mL/L of blend) | Initial pH | Final pH | S²⁻ (mg/L) | % AOX reduction |
| --- | --- | --- | --- | --- | --- |
| NaOH | 80 | 8.4 | 7.3 | 0 | 11.8 |
|  | 116 | 11.4 | 11.0 | 0 | 25.7 |
| NaOH/Na₂S | 0 (NaOH), 98 mg/L S²⁻ | 5.5 | 4.9 | 98 | 27.4 |
|  | 41 (NaOH), 98 mg/L S²⁻ | 8.1 | 8.8 | 98 | 31.5 |
|  | 86 (NaOH), 98 mg/L S²⁻ | 11.4 | 11.2 | 98 | 32.7 |
| Na₂CO₃/Na₂S | 2 (Na₂CO₃), 98 mg/L S²⁻ | 5.6 | 5.3 | 98 | 27.1 |
|  | 46 (Na₂CO₃), 98 mg/L S²⁻ | 7.9 | 8.7 | 98 | 30.4 |
|  | 214 (Na₂CO₃), 98 mg/L S²⁻ | 10.5 | 10.4 | 98 | 31.9 |
| WBL | 10.42 | 5.3 | 5.3 | 41 | 22.1 |
|  | 19.58 | 8.1 | 8.1 | 77 | 30.2 |
|  | 37.93 | 10.3 | 10.3 | 150 | 38.7 |
| Oxidized WBL | 11.75 | 5.1 | 5.3 | 3.6 | 13.1 |
|  | 22.07 | 8.2 | 7.8 | 6.7 | 18.1 |
|  | 45.09 | 10.4 | 10.4 | 14 | 30.2 |
| White liquor | 2.00 | 5.2 | 5.2 | 37 | 24.3 |
|  | 2.76 | 8.7 | 8.5 | 51 | 26.7 |
|  | 3.38 | 10.3 | 10.0 | 62 | 30.1 |
| Green liquor | 2.03 | 5.2 | 5.0 | 39 | 23.8 |
|  | 4.27 | 7.9 | 8.2 | 83 | 29.3 |
|  | 7.58 | 10.4 | 10.3 | 147 | 36.7 |

TABLE 12

Sulphide concentrations and AOX reductions for various treatments of $C_D/E$ blend

| | pH | | | | | |
|---|---|---|---|---|---|---|
| | 5 | | 8 | | 10* | |
| Treatment | $S^{2-}$ (mg/L) | % AOX reduction | $S^{2-}$ (mg/L) | % AOX reduction | $S^{2-}$ (mg/L) | % AOX reduction |
| NaOH | — | — | 0 | 11.8 | 0 | 25.7 |
| NaOH/Na$_2$S | 98 | 27.4 | 98 | 31.5 | 98 | 32.7 |
| Na$_2$CO$_3$/Na$_2$S | 98 | 27.1 | 98 | 30.4 | 98 | 31.9 |
| WBL | 41 | 22.1 | 77 | 30.2 | 150 | 38.7 |
| Oxidized WBL | 3.6 | 13.1 | 6.7 | 18.1 | 14 | 30.2 |
| White liquor | 37 | 24.3 | 51 | 26.7 | 62 | 30.1 |
| Green liquor | 39 | 23.8 | 83 | 29.3 | 147 | 36.7 |

*The pH for the NaOH, NaOH/Na$_2$S and Na$_2$CO$_3$/Na$_2$S was closer to 11.

TABLE 13

Expected vs. measured AOX of $C_D/E$ blend

| Treatment | pH | AOX (expected) (mg/L) | AOX (measured) (mg/L) | Estimated % AOX reduction in the E-stage effluent |
|---|---|---|---|---|
| NaOH | 8 | 46.3 | 44.6 | 7.6 |
| | 11 | 37.9 | 37.5 | 1.8 |
| NaOH/Na$_2$S | 8 | 36.8 | 34.6 | 9.8 |
| | 11 | 34.8 | 34.0 | 3.6 |
| Na$_2$CO$_3$/Na$_2$S | 8 | 36.8 | 35.1 | 7.6 |
| | 11 | 34.7 | 34.4 | 1.3 |

TABLE 14

Effect of lime mud pretreatment of $C_D/E$ blend on liquor addition and AOX reduction

| pH before pretreatment: | 2.50 |
|---|---|
| pH after pretreatment: | 3.38 |
| Treatment conditions: | 50° C. for 20 min |

| Treatment | Initial pH | Final pH | Lime mud (mg/L) | Liquor conc. in blend (mL/L) | $S^{2-}$ (mg/L) | % AOX reduction |
|---|---|---|---|---|---|---|
| White liquor | 8.7 | 8.5 | 0 | 2.76 | 51.0 | 26.7 |
| | 8.4 | 8.1 | 226 | 2.08 | 38.3 | 23.3 |
| Green liquor | 7.9 | 8.2 | 0 | 4.27 | 82.7 | 29.3 |
| | 8.3 | 8.3 | 226 | 3.58 | 69.4 | 31.6 |

We claim:

1. A process for converting adsorbable organic chlorine in a pulp bleach effluent containing a chlorination effluent, to inorganic chloride comprising:
  adjusting the pH of a bleached kraft chlorination effluent containing adsorbable organic chlorine to about 6 to about 11 with an alkaline composition, wherein either
  the pH adjusting being carried out in combination with the addition of a chemical agent selected from sulphides, dithionites, stannous chloride and zinc chloride in an amount effective to convert said adsorbable organic chlorine to said inorganic chloride.

2. A process according to claim 1 wherein said pulp bleach effluent additionally contains a first caustic extraction (E$_1$) effluent, said process including:
  subjecting the pH adjusted effluent to an elevated temperature of 110° to 150° C. and an elevated pressure of 70 to 475 kPa.

3. A process according to claim 2 wherein said effluent comprises a bleached kraft chlorination (C$_D$) effluent.

4. A process according to claim 3, wherein said effluent is a mixture of said C$_D$ effluent and said first caustic extraction (E$_1$) effluent.

5. A process according to claim 2, wherein said chemical agent is an inorganic sulphide in an amount of 40 to 200 mg/l.

6. A process according to claim 2 wherein said alkaline composition is selected from caustic soda, sodium carbonate, lime, limestone, lime mud, alkaline mill condensates, white liquor, green liquor and black liquor.

7. A process for converting adsorbable organic chlorine in a pulp bleach effluent containing a chlorination effluent, to inorganic chloride comprising:
  adjusting the pH of a bleached kraft chlorination effluent containing adsorbable organic chlorine to about 6 to 11 with an alkaline composition in combination with the addition of inorganic sulphide in an amount of 40 to 200 mg/l.

8. A process according to claim 7 wherein said effluent comprises a bleached kraft chlorination (C$_D$) effluent,
  said alkaline composition is a kraft mill alkaline composition selected from caustic soda, sodium carbonate, lime, limestone, lime mud, alkaline mill condensates, white liquor, green liquor and weak black liquor.

9. A process according to claim 8 wherein said alkaline composition is white liquor, green liquor or weak black liquor having a content of sulphide to satisfy said amount.

10. A process according to claim 8 wherein said inorganic sulphide is sodium sulphide, and said sodium sulphide is added to the effluent.

11. A process according to claim 8 which includes a preliminary pH adjustment with lime mud to establish a pH of 3 to 4 and said adjusting in the presence of said sulphide is carried out with caustic soda, lime or white liquor to increase the pH to 7.

12. A process according to claim 11, wherein said alkaline composition is white liquor having a content of sulphide to provide said amount of 40 to 200 mg/l.

13. A process according to claim 7 wherein said effluent is a combined effluent comprising bleached kraft chlorination (C$_D$) effluent and first caustic extraction (E$_1$) effluent and said alkaline composition is a kraft mill alkaline composition selected from caustic soda, sodium carbonate, lime, limestone, alkaline mill condensates, lime mud, white liquor, green liquor and weak black liquor to convert said adsorbable organic chlorine to said inorganic chloride.

14. A process according to claim 13, wherein said alkaline composition is white liquor, green liquor or weak black liquor having a content of sulphide to provide said amount of 40 to 200 mg/l.

15. A process according to claim 7, wherein said alkaline composition is a green liquor having a content of sulphide to provide said amount of 40 to 200 mg/l.

* * * * *

UNITED STATES PATENT AND TRADEMARK OFFICE
CERTIFICATE OF CORRECTION

PATENT NO. : 5,120,448  
DATED : June 9, 1992  
INVENTOR(S) : Joseph G. Dorica et al Page 1 of 3

It is certified that error appears in the above-identified patent and that said Letters Patent is hereby corrected as shown below:

In the title (item 54) on the cover page, delete "FRM" and insert therefor ... FROM ... .

In item 76 on the cover page, in the identification of the first named inventor, delete "Josesph" and insert therefor ... Joseph ... .

In item [56] OTHER PUBLICATIONS in the right hand column of the cover page, in the ninth line in the identification of the Bottger et al. publication, delete "Pumping" and insert therefor ... Pulping ... .

In the list of OTHER PUBLICATIONS in the right hand column of the cover page, at line 17 in the identification of the A. Smeds et al. publication, delete "Pump" and insert therefor ... Pulp ... .

In item [57] Abstract, in the right hand column at the third line, delete "destablized" and insert therefor ... destabilized ... ; and at the tenth line, delete "taht" and insert therefor ... that ... .

At column 1 in the title, delete "FRM" and insert therefor ... FROM ... .

At column 1, line 61, delete "compound" and insert therefor ... compounds... .

In column 2, line 57, delete "ultra filtration" and insert therefor ... ultrafiltration ... .

UNITED STATES PATENT AND TRADEMARK OFFICE
CERTIFICATE OF CORRECTION

PATENT NO. : 5,120,448

DATED : June 9, 1992

INVENTOR(S) : Joseph G. Dorica et al

It is certified that error appears in the above-identified patent and that said Letters Patent is hereby corrected as shown below:

At column 2, line 58, delete the "." after ... C ... .

At column 4, line 9, after "employed as" insert ... the alkaline composition to provide a pH of 7 to 8 and a ... .

At column 6, line 11, after "line 12" insert ... to ... .

At column 7, line 37, delete "88" and insert therefor ... 83 ... .

At column 8, line 37, delete "Was" and insert therefor ... was ... .

At column 9, line 9, delete "test" and insert therefor ... tests ... .

At column 9, line 30, after "$Na_2S$" insert ... dose ... .

At column 9, line 31, delete "ph" and insert therefor ... pH ... .

At column 9, line 35, delete "$Na_2$" and insert therefor ... $Na_2S$ ... .

At column 10, line 61, delete "the" and insert therefor ... at ... .

At column 10, line 63, delete "att" and insert therefor ... at ... .

At column 16, in Table 8-continued, at line 8 in the first column of numbers delete "10.2" and insert therefor ... 10.4 ... .

At column 16, line 23, in the fifth column of numbers, delete "71.2" and insert therefor ... 17.2 ... .

UNITED STATES PATENT AND TRADEMARK OFFICE
CERTIFICATE OF CORRECTION

PATENT NO. : 5,120,448

DATED : June 9, 1992

INVENTOR(S) : Joseph G. Dorica et al

It is certified that error appears in the above-identified patent and that said Letters Patent is hereby corrected as shown below:

At column 16, in Table 10, at line 38 in the fifth column of numbers, delete "2.65" and insert therefor ... 26.5 ... .

At column 18, line 19, being the last line of claim 6, after "green liquor and" insert ... weak ... .

Signed and Sealed this

Thirtieth Day of November, 1993

BRUCE LEHMAN

Attest:

Attesting Officer

Commissioner of Patents and Trademarks